United States Patent [19]

Felstead

[11] 4,108,538

[45] Aug. 22, 1978

[54] FREQUENCY PLANE FILTERS FOR AN OPTICAL PROCESSOR FOR SYNTHETIC APERTURE RADAR

[75] Inventor: E. Barry Felstead, Kanata, Canada

[73] Assignee: Her Majesty the Queen in right of Canada as represented by the Minister of National Defence, Ottawa, Canada

[21] Appl. No.: 774,902

[22] Filed: Mar. 7, 1977

[30] Foreign Application Priority Data

Apr. 30, 1976 [CA] Canada .................................. 251565

[51] Int. Cl.$^2$ ............................................. G02B 5/18
[52] U.S. Cl. .............................. 350/162 SF; 350/3.82
[58] Field of Search ......................... 350/3.5, 162 SF

[56] References Cited

U.S. PATENT DOCUMENTS

| | | | |
|---|---|---|---|
| 3,640,604 | 2/1972 | Yarnell | 350/162 SF |
| 4,071,907 | 1/1978 | Casasent | 350/162 SF X |

OTHER PUBLICATIONS

Stark et al., "Optical Processing of Radar Signals . . .", Applied Optics, vol. 10, No. 12, Dec. 1971, pp. 2728-2733.
Kozma et al., "Tilted-Plane Optical Processor", Applied Optics, vol. 11, No. 8, Aug. 1972, pp. 1766-1777.
Lee et al., "Matched Filter Optical Processor", Applied Optics, vol. 13, No. 4, Apr. 1974, pp. 925-930.
Kock, "A Real-Time Parallel Optical Processing Technique", IEEE Trans. On Computers, vol. c-24, No. 4, Apr. 1975, pp. 407-411.

Primary Examiner—John K. Corbin
Assistant Examiner—John D. Lee
Attorney, Agent, or Firm—Michael M. Sakovich

[57] ABSTRACT

An air-borne radar system for terrain-imaging employs a sidelooking synthetic-aperture radar that records reflected signals on photographic film. Range data has a constant focal length whereas data in an azimuth direction has a focal length that varies as a function of range and therefore requires optical correction. A known processor system brings the various focal planes into coincidence using a complex lens structure that includes a computer generated spatial filter. A novel method and apparatus is disclosed for interferometrically generating a two-dimensional spatial filter which is more simple and economical to produce. Means are provided for diffracting a source beam of coherent light into a beam having a predetermined amplitude distribution. The resulting beam is imaged through a lens system onto a light responsive recording medium together with direct illumination from a reference source of coherent light to obtain a predetermined intensity distribution. The intensity of the exposing light is determined by both a magnification and a Fourier transformation of the diffracted beam. After development, the recording medium has an amplitude transmittance necessary for the desired spatial filter and may be used directly in the known processor system.

8 Claims, 4 Drawing Figures

FREQUENCY PLANE FILTERS FOR AN OPTICAL PROCESSOR FOR SYNTHETIC APERTURE RADAR

BACKGROUND OF THE INVENTION

This invention relates to a frequency domain optical processor for producing imagery in a sidelooking syntheticaperture radar system, and more particularly to the use of a spatial matched filter in the production of the imagery through interferometry.

Air-borne radar systems have been developed for imaging of the earth's surface using a small, sidelooking antenna that scans an area alongside the aircraft's track coordinate, herein referred to as the azimuth coordinate. The antenna of the system radiates and receives a beam of RF pulses. The beam pattern is relatively wide along the aximuth coordinate which scans the terrain by virtue of the forward motion of the aircraft. In the cross-track coordinate, herein referred to as the slant-range coordinate, the radiated pulses scan the illuminated areas of the terrain in a direction orthogonal to the azimuth coordinate by virtue of the differential time delay. Since the area illuminated by the beam is disposed to one side of the azimuth coordinate, the slant-range coordinate has a simple relation to range measure along the earth's surface.

In order to provide radar imagery having angular resolution capabilities comparable with photo-reconnaissance systems, the azimuth dimension of the radar beam must be very large, particularly as the distance from the antenna to the target increases. It is in fact known that to have an acceptable azimuth resolution at long ranges, the length of the antenna aperture in the radar system can reach impractical lengths which, of course, an aircraft could not carry.

A known synthetic-aperture technique provides a synthesized antenna of suitable length which will provide the required resolving power. Thus, although the sidelooking antenna, which in itself is relatively small, scans the terrain continuously, it may be considered as if it scans the terrain at discrete positions which are determined by the forward speed of the aircraft. Accordingly, each of the discrete positions operates as a single element in a large antenna array. At each of these positions, the antenna radiates and receives a signal which is stored, the stored signals are then processed in a manner analogous to the physically large array. The resultant output signal of the small sidelooking antenna is characterized by an improved signal-to-noise ratio as well as an improved target resolving capability which are characteristics to be found in an output signal obtainable from the large antenna structure.

Summation of the discrete signals developed in the synthetic-aperture radar system is performed in one instance by way of a photographic technique which provides high-density storage together with fine-resolution imaging. A known method employs the radar receiver output, which comprises a series of reflected range pulses, to intensity modulate the beam of a cathode-ray tube. The beam is swept vertically and corresponds in scale to the slant-range coordinate, thus providing a single line trace. A film strip is transported past the trace to record the beam intensity variations. Thus, data information is recorded in a two dimensional format, the dimension across the film representing range, and the longitudinal direction of the film corresponding to the azimuth. In this respect, it will be noted that the time variable has been converted to a space variable that is defined in terms of film length.

The use of photographic film as a store for the radar data provides a convenient solution to the problems associated with storage and manipulation of high resolution signal information. However, these advantages are obtained in exchange for problems experienced when processing the recorded raw data to obtain a reproduced photographic image like that of a conventional aerial photograph. For example, since the target area is illuminated by the radar beam at an angle of incidence less than 90° and has a slant-range coordinate, the recorded radar signal image is tilted with respect to the plane of the recording film so that returning signals having a short slant-range coordinate produce signal recordings having shorter focal lengths. Conversely, an RF pulse returning to the antenna along a longer slant-range coordinate produces a signal record image having a longer focal length. It will be understood that these focal properties apply only in the azimuth direction and that in the range direction resolution is obtained by pulse modulation of the radar signals. The image in range is thus in a plane parallel to the film record whereas the azimuth image is in a plane tilted with respect to the plane of the recording film.

Optical processor systems in the prior art are known which bring the foregoing two planes into coincidence. In one known system, a complex lens structure was used which in appearance comprised a vertical section of a cone and was referred to as an "axicon" lens. Processors employing the axicon lens were subsequently supplanted by a tilted-plane processor which provided more versatility and considerably improved imagery. A third method involved a matched filtering operation in the spatial frequency domain. This latter method has all of the advantages of the tilted plane processor together with a further advantage, that readily available and inexpensive optical elements may be employed.

Various attempts were made to develop an appropriate spatial filter, one of which involved putting two cylindrical lenses in tandem with one of the lenses being appropriately tilted. Another solution was a computer-generated matched filter. However, a limitation of the computer-generated matched filter technique is that inadequate resolution is obtained through inherent limitations in the method which limits the accuracy and quality of the filter. In order to alleviate this deficiency, an improvement in resolution was sought by substituting computer generation of the filter with an interferometric technique.

SUMMARY OF THE INVENTION

The present invention provides a method and apparatus for generating a spatial filter that may be used directly in an optical processor of the prior art and to a spatial filter which is more simple and economical to produce.

The method and apparatus of the invention further provides for interferometrically generating a two-dimensional spatial filter for use in the known processor.

Optical elements in the apparatus of the invention are readily obtainable and fabricated and are simple to set up since there are no critical angles at which the elements must be set.

The disadvantages of the prior art as noted in the foregoing discussion may be substantially overcome and the various provisions of the invention may be achieved by recourse to the invention disclosed in the following specification.

One aspect of the invention relates to a method for interferometrically generating a two-dimensional spatial filter. The method comprises the steps of:

diffracting a source beam of coherent light to form a diffracted beam having a predetermined amplitude distribution;

imaging the diffracted beam onto a plane surface of a light responsive recording medium, the imaging including predetermined magnification in a first direction and Fourier transformation in a direction orthogonal thereto to obtain a predetermined amplitude distribution on the plane surface; and illuminating the plane surface from a reference source of coherent light at a predetermined angle relative to the first direction to obtain a predetermined amplitude transmittance in the medium proportional to the intensity of the exposing light.

A second aspect of the invention relates to an apparatus for interferometrically generating the two-dimensional spatial filter. The apparatus comprises means for diffracting a source beam of coherent light to form a diffracted beam having a predetermined amplitude distribution. Means are provided for imaging the diffracted beam onto a plane surface of a light responsive recording medium, the imaging means providing predetermined magnification in a first direction and Fourier transformation in a direction orthogonal thereto to obtain a predetermined amplitude distribution on the plane surface. Further, means are provided for illuminating the plane surface from a reference source of coherent light at a predetermined angle relative to the first direction to obtain a predetermined amplitude transmittance in the medium proportional to the intensity of the exposing light.

DESCRIPTION OF THE DRAWINGS

The invention will now be more particularly described with reference to embodiments thereof shown, by way of example, in the accompanying drawings wherein.

DESCRIPTION OF THE ILLUSTRATED EMBODIMENTS

Figure 1A:
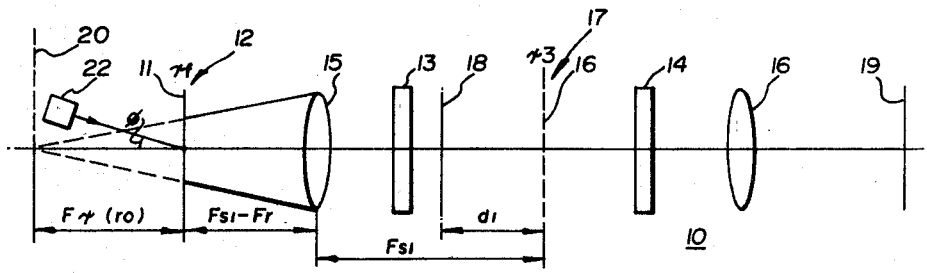
FIG. 1(a) is a schematic diagram of a known optical processor and illustrates the azimuth dimension of the processor.

FIGS. 1(a) and (b) schematically illustrate a known frequency domain optical processor 10 which is used in producing imagery for synthetic aperture radar systems. Since the spatial filter produced by the method and apparatus of the present invention is intended for use in the processor 10, an explanation of the processor will be presented herein. However, if a more detailed description of the processor 10 is required, further information may be obtained by referring to the following publication: Lee, Wai-Hon and M. O. Greer, "Matched Filter Optical Processor," Apl. Opt., vol. 13, pp. 925-930, April 1974.

According to the preceding discussion of the prior art, synthetic aperture radar data are recorded on photographic film which is shown in the drawings as an interferogram 11. As previously noted, the object of the radar system is to process the interferogram so as to produce an image of a target area, including terrain, in which, preferably, the range and azimuth scales are equal. However, in the radar signal recording process the azimuth information is demagnified $p$ times onto the $x_f$ axis of the film and the range information is demagnified $q$ times onto the $r_f$ axis of the film, where $p$ and $q$ are not necessarily equal.

Figure 1B:
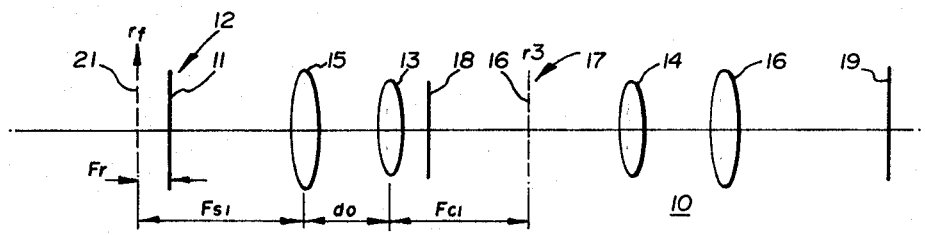
FIG. 1(b) is a further schematic diagram of the optical processor of FIG. 1(a) and illustrates the range dimension of the processor.

Referring now to FIG. 1, the interferogram 11 is shown placed in an input plane 12 of the processor 10. Two views of the processor 10 are given in FIGS. 1(a) and 1(b). FIG. 1(a) is a side elevation view of the processor and FIG. 1(b) is a plan view, both of which show the orientation of a pair of cylindrical lenses 13 and 14 relative to the $x_f$ and $r_f$ coordinates of the interferogram 11. It will be seen in the drawings that the processor s10 also includes a pair of spherical lenses 15 and 16, that $F_{S1}$ is the focal length of the spherical lens 15 and that $F_{C1}$ is the focal length of the cylindrical lens 13. In FIG. 1(b), a distance $F_r$ is a constant value. A spatial filter 16 is located at a filter plane 17. A virtual image in both dimensions appears in an image plane 18 located at a distance $d_1$ in front of the filter plane 17. The desired real image of the terrain appears at an output plane 19.

For a single point source located on the ground at a location $(x_o, r_o)$, where $x_o$ is the azimuth location and $r_o$ is the range measured from the aircraft, the amplitude transmittance of the interferogram is $$t_i(x_f, r_f) = t_b + \sigma_o \, \text{rect} \left\{ \frac{r_f - \frac{r_o}{q}}{\frac{\Delta r}{q}} \right\} \quad (1)$$

$$\times \cos \left[ 2\pi f_c x_f + \frac{2\pi p^2}{\lambda_r r_o} \left( x_f - \frac{x_o}{p} \right)^2 + \theta_o \right]$$

where:

$p$ = azimuth demagnification
$q$ = range demagnification
$(x_f, r_f)$ = coordinates on film
$f_c$ = spatial carrier frequency, cycles/cm
$\lambda_r$ = wavelength of radar signal
$\Delta r$ = width of transmitted radar pulse in terms of distance and $\delta_o$ = reflectivity of point reflector at $(x_o, r_o)$ The interferogram 11 having a transmittance defined by (1) is placed in the input plane 12. It will be noted that the cosine term of (1) represents a zone plate along the azimuth direction $x_f$ with an equivalent focal length of $$F_x(r_o) = \pm \frac{\lambda_r}{2p^2 \lambda} r_o \quad (2)$$

where $\lambda$ is the wavelength of light. It will be seen in FIG. 1(a) that an azimuth focal plane 20 is located a distance $F_x$ from the input plane 11, and that $F_x$ is dependent on the range, $r_o$. The rect function of (1) describes the shape of a short rectangular radar pulse of width $\Delta r$. In some cases where increased range resolution is required, the rectangular pulse is replaced by a longer linear FM pulse. Then, the range pattern on the interferogram 11 also has the form of a zone plate with equivalent focal length $$F_r = \pm \frac{\pi c^2}{(q^2 \lambda S)} \tag{3}$$

where $c$ = velocity of the radar signal and S is the frequency modulation rate of the liner FM. Plane parallel light impinging upon the interferogram 11 is focused in the azimuth dimension to the plane 20, a distance $F_x(r_o)$ in front of the interferogram 11, and in the range dimension to a range focal plane 21, the distance $F_r$ in front of the interferogram 11.

The processor 10 is referred to in the prior art entirely in terms of imaging where the system is designed to bring both the range focal plane 21 and the azimuth focal plane 20 input focus at the same output plane 19. Thus, the filter 16 is described in terms of a lens having a focal length that varies as a function of range $r_3$. From an alternate point of view, the $x$ dimension operation can be described in terms of matched filtering as in the following description of the subject invention.

The input transmittance defined by (1) is a linearly frequency-modulated carrier wave having an offset $x_o/p$ in the $x_f$ direction. Because it is a linear FM, an obvious method of resolving the position $x_o$ is to cross-correlate this function in the $x_f$ dimension with a suitable linear FM reference function. This may be done by matched filtering in the frequency domain by means of a Vander Lugt filter. For a detailed explanation of this filter, reference may be made to the following publication: Vander Lugt, A., "Signal Detection by Complex Spatial Filtering," IEEE Trans. Inf. Th., vol. IT-10, pp. 139–145, April 1965. Since the rate of frequency sweep is a function of range $r_o$, a different matched filter is required for every different range value. Thus, each range element must be processed separately in the frequency domain. This is accomplished, as shown in FIG. 1, by imaging the plane 21 onto the plane 17 in the range dimension, while Fourier transforming in the azimuth dimension between the plane 12 and the plane 17. Thus, the Fourier transform in the $x$-dimension is present for every value of range.

The input plane 12 is illuminated with plane-parallel monochromatic light, herein referred to as coherent light, obtained from a source 22 and having an amplitude $$A_o e^{-j2\pi \frac{\sin\phi}{\lambda} x_f}$$

where $\phi$ is the angle of incidence and is adjusted so that $\sin\phi/\lambda = f_c$. If range compression is used, it is to be understood that the rect function in (1) is an approximation to the compressed signal and that $r_f$ is located in the plane 21 rather than the plane 12. The width $\Delta r/q$ is now the effective compressed width. The amplitude distribution, at the plane 17 is then $$a_3(x_3, r_3) = t_b \delta(x_3 + \lambda F_{SI} f_c) + \text{rect}\left[\frac{\frac{r_3}{M_{rl}} - \frac{r_o}{q}}{\frac{\Delta r}{q}}\right] e^{j\frac{k}{2f_{Cl}}\left(1 - \frac{d_o - F_{SI}}{F_{Cl}}\right)r_3^2} \tag{4}$$

$$\times c_1 e^{j\frac{k}{2F_{SI}}\left(1 - \frac{F_{SI} - F_r}{F_{SI}}\right)x_3^2} \times \left\{ e^{j\theta_o} \int_{-\infty}^{\infty} e^{j\frac{2\pi p^2}{\lambda r_o}\left(x_f - \frac{x_o}{p}\right)^2} e^{-j2\pi f_x x_f} dx_f + c.c(-2f_c) \right\}$$

where $M_{rl} = F_{Cl}/F_{SI}$, $k = 2\pi/\lambda$, $c.c(-2f_c)$ means complex conjugate of the previous term centered on $f_x = 2f_c$, $f_x = x_3/(\lambda F_{SI})$, and $c_l$ is a complex constant. Note that $d_o - F_{SI} = -F_{Cl}$ and use the fact that $$\int_{-\infty}^{\infty} e^{jaq^2} e^{j2\pi bq} dq = \sqrt{\frac{\pi}{a}} e^{j\frac{\pi}{4}} e^{\frac{-j\pi^2 b^2}{a}} \tag{5}$$

to obtain $$a_3(x_3, r_3) = t_b \delta(x_3 + \lambda F_{SI} f_c) + c_2 \text{rect}\left[\frac{\frac{qr_3}{M_{rl}} - r_o}{\Delta r}\right] e^{j\frac{k}{2F_{SI}}\left(1 - \frac{F_{SI} - F_r}{F_{SI}}\right)x_3^2} \tag{6}$$

$$\times \left\{ e^{-j\pi^2 \left(\frac{x_3}{\lambda F_{SI}}\right)^2 \frac{\lambda r_o}{2\pi p^2}} e^{-j2\pi \frac{x_3}{\lambda F_{SI}} \frac{x_o}{p}} + c.c(-2f_c) \right\}$$

where $c_2$ = a complex constant. If the spatial carrier $f_c$ is sufficiently large compared to the bandwidth of the azimuth linear FM signal then the bias term $t_b \delta(x_3 - F_{SI} f_c)$ and the $c.c(-2f_c)$ term can be blocked off at plane $P_3$. Only the component $$a_3(x_3, r_3) = c_2 \text{rect}\left[\frac{\frac{qr_3}{M_{rl}} - r_o}{\Delta r}\right] e^{j\frac{k}{2F_{SI}}\left(1 - \frac{F_{SI} - F_r}{F_{SI}}\right)x_3^2} e^{-j\frac{\pi \lambda r_o x_3^2}{2p^2(\lambda F_{SI})^2}} e^{-\frac{j2\pi x_3 x_o}{p\lambda F_{SI}}} \tag{7}$$

is transmitted. Due to the proper selection of the angle of incidence $\theta$, this component is centered in the $x_3$ dimension, on the optical axis. The first quadratic phase term in (7) is due to the fact that the lens 15 is not exactly a focal length from the range focal plane 21 and it will be seen how it may be cancelled by the filter 16. The second quadratic phase term is the spectrum of the input azimuth linear FM. For matched filtering, it is required to multiply this term by its complex conjugate. The remaining complex exponential term describes a plane wave tilted at an angle proportional to $x_o$. This wave corresponds to a point image at infinity. In normal Vander Lugt filtering, this point image is brought in from infinity to the focal plane of an additional lens. Here, the point is to be imaged at the plane 18 located a distance $d_1$ in front of the plane 17. This is accomplished by multiplying $a_3(x_3,r_3)$ by a term $exp(jkx_3^2/2d_1)$ which corresponds to a quadratic approximation of a spherical wave due to a point source at the plane 18. In summary, it is required to construct a filter corresponding to the filter 16 and having a transmittance that is proportional to $$e^{-j\frac{k}{2}\left(\frac{1}{F_{SI}} - \frac{F_{SI} - F_r}{F^2_{SI}} - \frac{1}{d_1}\right)x_3^2} \times e^{+j\frac{\pi\lambda_r r_o}{2\rho^2(\lambda F_{SI})^2}x_3^3} \quad (8)$$

Once the azimuth image is cast onto the plane 18, the desired real image of the terrain appears at the plane 19.

Figure 2:
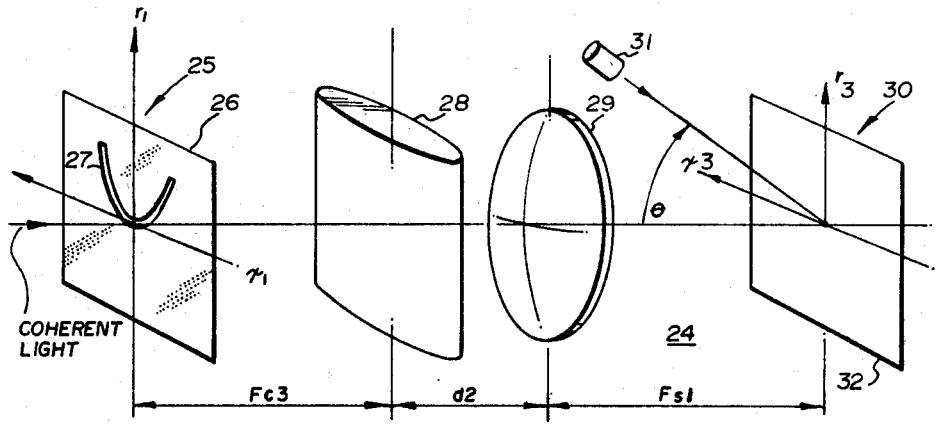
FIG. 2 is a perspective view of apparatus in accordance with the invention for interferometrically generating a two-dimensional spatial filter for use in the system of FIG. 1.
Figure 3:
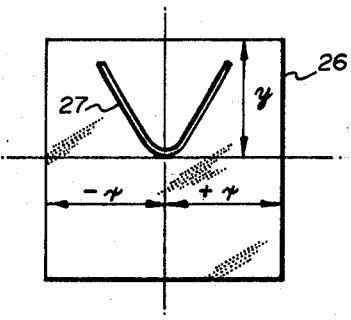
FIG. 3 is an enlarged front elevation view of an optical screen used in the apparatus of FIG. 2.

A filter 16 produced by the method and apparatus of the present invention and in accordance with the transmittance given by (8) may be constructed by means of an apparatus 24 shown in FIG. 2. Referring to this figure, there will be seen as input plane 25 in which there is placed an opaque screen 26 having a curved slit 27 where the distance of the slit from an $x_1$ axis is proportional to $x_1^2$. A source beam of coherent light illuminates one side of the screen 26 and produces a diffracted beam on the other side determined by the shape of the slit 27. The correct shape of the slit 27 may be more readily seen in FIG. 3 wherein conventional $x$ and $y$ coordinates indicate the relationship of $y$ with respect to $x$. Its transmittance is $$t_1(x_1,r_1) = \text{rect}\left(\frac{x_1}{W}\right)\text{rect}\left[\frac{r_1 - \gamma x_1^2}{\epsilon}\right] \quad (9)$$

where $\gamma$ is a constant, $\epsilon$ is the width of the slit in the $r_1$ direction, and $w$ is the total width of the slit in the $x_1$ direction. A feature of this structure is that the screen 26 together with the slit 27 is very simple to construct and may be readily drawn by hand or by a computer at a large scale and then photoreduced to an appropriate size to minimize any errors.

It will be seen that the apparatus 24 includes a cyclindrical lens 28 and a spherical lens 29 which are placed between the input plane 25 and an output plane 30 to provide imaging onto the plane 30. The long axis of the cylindrical lens is disposed parallel to the $r_1$ and $r_3$ axes. The result is magnification $M_1 = -F_{SI}/F_{C3}$ in the azimuth dimension and Fourier transformation in the range dimension. The amplitude distribution at the plane 30 is thus, $$g(x_3,r_3) = \quad (10)$$

-continued $$c_3 \text{rect}\left(\frac{x_3}{M_1 w}\right) e^{j\frac{k}{2F_{SI}}\left(1 - \frac{d_2 - F_{C3}}{F_{SI}}\right)x_3^2} \epsilon \frac{\sin(\pi\epsilon r_3/\lambda F_{SI})}{\pi\epsilon r_3/\lambda F_{SI}}$$

$$e^{-j2\pi\gamma}\left(\frac{x_3}{M_1}\right)^2 \left(\frac{r_3}{\lambda F_{SI}}\right) e^{j\frac{k}{2F_{SI}}\left(1 - \frac{d_2 + F_{C3}}{F_{SI}}\right)r_3^2}$$

where $c_3$ is a complex constant, and $F_{C3}$ and $F_{SI}$ are respective focal lengths of the lenses 28 and 29. The slit 27 has a width $\epsilon$ which is made sufficiently small that $\text{sinc}(\epsilon r_3/\lambda F_{SI}) \simeq 1$ over the entire range dimension used. Thus, $$g_3(x_3,r_3) \simeq c_4 \text{rect}\left(\frac{x_3}{M_1 w}\right) e^{-j2\pi\gamma' x_3^2} e^{j\frac{k}{2}\left(\frac{1}{F_{SI}} - \frac{d_2 - F_{C3}}{F^2_{SI}}\right)x_3^2} \quad (11)$$

$$e^{j\frac{k}{2F_{SI}}\left(1 - \frac{d_2 + F_{C3}}{F_{SI}}\right)r_3^2}$$

where:

$$\gamma' = \frac{\gamma}{M_1^2 \lambda F_{SI}} \quad (12)$$

To form the Vander Lugt filter a plane reference wave, obtained from a reference source 31 of coherent light, $$a_r(r_3) = a_{ro} e^{-j2\pi\frac{\sin\theta}{\lambda}r_3} \quad (13)$$

is added to $g_3$ where $\theta$ is the angle of incidence as shown in FIG. 2 and $a_{ro}$ is a constant. The intensity $|g_3 + a_r|^2$ illuminates a photographic plate 32 that is placed in the output plane 30 and the plate is exposed and developed to form a transparency having an amplitude transmittance proportional to the intensity distribution (by exposing in the linear region of the plate's $t_a$-E curve). The amplitude transmittance of the transparency is thus $$t_3(x_3,r_3) = c_5\left(a_{ro} + |g_3(x_3,r_3)|^2 + a_{ro}g_3(x_3,r_3)e^{j\frac{2\pi}{\lambda}\sin\theta r_3} + a_{ro}g_3^*(x_3,r_3)e^{-j\frac{2\pi}{\lambda}\sin\theta r_3}\right) \quad (14)$$

where $c_5$ is a constant.

The transparency is used as the filter 16 in the plane 17 of FIG. 1. The amplitude of the light emerging from the plane 17 is now $a_3t_3$ where $a_3$ is given by (7) and $t_3$ by (14). If $\theta$ of FIG. 2 is sufficiently large, then the four components of (14) result in spatially separable spectra in the Fourier transform plane that exist to the right of the plane 17. All the spectra except the one due to the term of (14) containing $g_3^*$ are blocked. It is this term that corresponds to the filter defined by (8). Thus, only the last term of (14) contributes to the output so that the effective amplitude emerging from the plane 17 is $$a'_3(x_3, r_3) = c_6 \text{ rect}\left(\frac{x_3}{M_1 w}\right) \text{rect}\left[\frac{\frac{qr_3}{M_{r1}} - r_0}{\Delta r}\right] e^{-j\frac{k}{2F_{SI}}\left(1 - \frac{d_2 + F_{C3}}{F_{SI}}\right)r_3^2} e^{-j\frac{2\pi}{\lambda}\sin\theta r_3} \times \quad (15)$$

$$e^{j\frac{k}{2}\left(\frac{1}{F_{SI}} - \frac{F_{SI} - F_r}{F_{SI}^2}\right)x_3^2} e^{j\frac{k}{2}\left(\frac{1}{F_{SI}} - \frac{d_2 - F_{C3}}{F_{SI}^2}\right)x_3^2} \times$$

$$e^{-j2\pi\frac{\lambda_r r_0}{4p^2\lambda^2 F_{SI}^2}x_3^2} e^{+j2\pi\gamma' r_3 x_3^2} \times e^{-j\frac{2\pi}{\lambda F_{SI}}\cdot\frac{x_3 x_0}{p}}$$

The first three terms that are functions of $r_3$, describe the range image multiplied by a quadratic phase factor and by a linear phase factor. Since all subsequent operations in the range dimension involve imaging only, the phase factors are merely imaged to the output plane 19 of FIG. 1 along with the desired image. Upon detection, the phase factor becomes unity. Thus, the phase factors are now omitted.

If the filter function $t_3$ is constructed so that $$\gamma' r_3 = \frac{\lambda_r}{4p^2 \lambda^2 F_{SI}^2} r_0, \quad (16)$$

$$\text{i.e., } \gamma = \frac{r_0}{r_3} \cdot \frac{\lambda_r F_{SI}}{4p^2 \lambda F_{C3}},$$

then the quadratic phase factors that are functions of $r_o$ cancel to give unity. Furthermore, if $d_2$ is selected so that $$-\frac{F_{SI} - F_r}{F_{SI}^2} + \frac{d_2 - F_{C3}}{F_{SI}^2} = +\frac{1}{d_1}$$

i.e., $$d_2 = \frac{F_{SI}^2}{d_1} + F_{SI} + F_{C3} - F_r, \quad (17)$$

then $a'_3(x_3, r_3) =$ $$c_6 \text{ rect}\left[\frac{\frac{qr_3}{M_{r1}} - r_0}{\Delta r}\right] e^{j\frac{k}{2d_1}x_3^2} e^{-j2\pi\left(\frac{x_3}{\lambda F_{SI}}\right)\frac{x_o}{p}}, \quad (18)$$

where the quadratic phase term describes a spherical wave diverging from a point at the plane 18 and the linear phase term in $x_3$ results in an offset of the point by an amount proportional to $x_o/p$. The desired result is thus achieved. Subsequent processing is identical to that previously described in the processor 10.

The ratio $r_o/r_3$ in (16) is found by noting that a point on the ground at $r_o$ is located at $r_1 = r_o/q$ in the plane 12 and is imaged to $r_3 = (r_o/q)M_{r1} = -(F_{C1}/F_{SI})(r_o/q)$. Thus, (16) becomes $$\gamma = -\frac{\lambda_r F_{SI}^2 q}{4p^2 F_{C1} F_{C3}^2 \lambda} \quad (19)$$

The system magnification ratio $K'$ is given by [3]

$$K' = \frac{M_r}{M_a} = \frac{1}{4}\left(\frac{F_{C1}}{F_{C2}}\right)\left[1 + \left(1 + 4\frac{F_{C2}}{d_1}\right)^{\frac{1}{2}}\right]^2 \quad (20)$$

where $M_r$ is total range magnification and $M_a$ is total azimuth magnification. If $K'$ is made equal to the input aspect ratio $K = q/p$ then the output image has an aspect ratio of unity.

The position of the lenses 28 and 29 in FIG. 2 may be interchanged, in certain cases, and the method of the invention will still perform satisfactorily. Even lens combinations other than those shown in FIG. 2 may be employed. Similarly, the lenses 15 and 13 in FIG. 1 can likewise be interchanged to produce satisfactory results.

For the processor described in FIG. 1, a change in either $p$ or $q$ would require a new filter 16. In this respect, it should be noted that by the method and apparatus described, it is relatively simple to construct a new filter. In fact, it is not unreasonable to construct a number of filters for an equal number of combinations of $p$ and $q$ in the event that the value of $K'$ is not maintained equal to K.

The major disadvantage of using a Vander Lugt filter is its very low diffraction efficiency defined as the ratio of the total light intensity diffracted into the desired order to the total incident light. For a planar amplitude-only filter, the maximum diffraction efficiency is 6.25% and even that cannot be achieved if reasonably linear output is required.

By comparison, coated lenses have nearly 100% transmission efficiency. Since the tilted-plane processor of the prior art uses lenses only, there is a substantial efficiency advantage over the frequency-plane processor using the filter 16. Fortunately, bleaching may be used to convert the amplitude filter to a phase filter and in doing so, the diffraction efficiency can be increased to as high as 65%. Better still, if a volume filter is constructed using dichromated gelatin, the diffraction efficiency can approach 100% along with low noise. Thus, with relatively little extra effort, the major disadvantage of holographic filtering can be overcome.

While a method and apparatus have been described for generating a spatial filter to solve a specific problem concerning variable focal lengths in the recorded radar signal image, the slit 27 may take on other configurations to deal with similar problems of radar signal imaging. The slit 27 may thus have a curvature that is defined by some other predetermined function in order to generate a suitable filter 16. Furthermore, it will be understood that the invention is not restricted to a diffracting aperture and may include a diffracting obstacle. In terms of FIG. 3, an example of a diffracting obstacle would be a transparent screen 26 having an opaque portion 27.

What I claim is:

1. A method for interferometrically generating a two-dimensional spatial filter, comprising the steps of:
   diffracting a source beam of coherent light by passing at least a portion of the source beam through a slit in an opaque screen, the slit having a predetermined width and a curvature defined by a specified function to form a diffracted beam having a predetermined amplitude distribution;
   imaging the diffracted beam onto a plane surface of a light responsive photographic plate by conducting the beam transversely through a cylindrical lens having a longitudinal axis disposed in parallel relation with the screen at a distance therefrom equal to the focal length of the cylindrical lens, and transversely through a spherical lens disposed intermediate the cylindrical lens and said plate at a distance from the plate equal to the focal length of the spherical lens, said imaging including predetermined magnification in an azimuth direction of the screen, lenses and plate and Fourier transformation in a direction orthogonal thereto to obtain a predetermined amplitude distribution on the plane surface;

illuminating the plane surface from a reference source of coherent light at a predetermined angle relative to the azimuth direction to obtain a predetermined amplitude transmittance in said plate proportional to the intensity of the exposing light;

developing the plate to obtain said filter in the form of a photographic transparency; and bleaching the transparency to increase its efficiency.

2. A method as claimed in claim 1 wherein a dependent variable of the function varies quadratically with respect to an independent variable thereof.

3. A method for interferometrically generating a two-dimensional spatial filter, comprising the steps of:

diffracting a source beam of coherent light by interrupting a portion of the source beam with an obstacle on a transparent screen, the obstacle having a predetermined width and a curvature defined by a specified function to form a diffracted beam having a predetermined amplitude distribution;

imaging the diffracted beam onto a plane surface of a light responsive photographic plate by conducting the beam transversely through a cylindrical lens having a longitudinal axis disposed in parallel relation with the screen at a distance therefrom equal to the focal length of the cylindrical lens, and transversely through a spherical lens disposed intermediate the cylindrical lens and said plate at a distance from the plate equal to the focal length of the spherical lens, said imaging including predetermined magnification in an azimuth direction of the screen, lenses and plate and Fourier transformation in a direction orthogonal thereto to obtain a predetermined amplitude distribution on the plane surface;

illuminating the plane surface from a reference source of coherent light at a predetermined angle relative to the azimuth direction to obtain a predetermined amplitude transmittance in said plate proportional to the intensity of the exposing light;

developing the plate to obtain said filter in the form of a photographic transparency; and bleaching the transparency to increase its efficiency.

4. A method as claimed in claim 3 wherein a dependent variable of the function varies quadratically with respect to an independent variable thereof.

5. Apparatus for interferometrically generating a two-dimensional spatial filter, comprising:

means for diffracting a source beam of coherent light to form a diffracted beam having a predetermined amplitude distribution, said means including an opaque screen having a light transmission slit therethrough with a predetermined width and a curvature defined by a specified function, the source beam of coherent light illuminating one side of the slit to form the diffracted beam on the other side;

means for imaging the diffracted beam onto a plane surface of a light responsive photographic plate which is developed to obtain said filter in the form of a photographic transparency that is bleached to improve its efficiency, said imaging means including a cylindrical lens disposed intermediate the screen and photographic plate, said lens having a longitudinal axis disposed in parallel relation with the screen at a distance therefrom equal to the focal length of the cylindrical lens, and a spherical lens disposed intermediate the cylindrical lens and said plate at a distance from the plate equal to the focal length of the spherical lens for providing predetermined magnification in an azimuth direction of the apparatus and Fourier transformation in a direction orthogonal thereto to obtain a predetermined amplitude distribution on the plane surface; and means for illuminating the plane surface from a reference source of coherent light having the same wavelength as the source beam, the illumination occurring at a predetermined angle relative to the azimuth direction to obtain a predetermined amplitude transmittance in said plate proportional to the intensity of the exposing light.

6. Apparatus as claimed in claim 5, wherein a dependent variable of the function varies quadratically with respect to an independent variable of said function.

7. Apparatus for interferometrically generating a two-dimensional spatial filter, comprising:

means for diffracting a source beam of coherent light to form a diffracted beam having a predetermined amplitude distribution, said means including an obstacle on a transparent screen interrupting a portion of the source beam, the obstacle having a predetermined width and a curvature defined by a specified function;

means for imaging the diffracted beam onto a plane surface of a light responsive photographic plate which is developed to obtain said filter in the form of a photographic transparency that is bleached to improve its efficiency, said imaging means including a cylindrical lens disposed intermediate the screen and photographic plate, said lens having a longitudinal axis disposed in parallel relation with the screen at a distance therefrom equal to the focal length of the cylindrical lens, and a spherical lens disposed intermediate the cylindrical lens and said plate at a distance from the plate equal to the focal length of the spherical lens for providing predetermined magnification in an azimuth direction of the apparatus and Fourier transformation in a direction orthogonal thereto to obtain a predetermined amplitude distribution on the plane surface; and means for illuminating the plane surface from a reference source of coherent light having the same wavelength as the source beam, the illumination occurring at a predetermined angle relative to the azimuth direction to obtain a predetermined amplitude transmittance in said plate proportional to the intensity of the exposing light.

8. Apparatus as claimed in claim 7 wherein a dependent variable of the function varies quadratically with respect to an independent variable of said function.

* * * * *